United States Patent

Nakamoto et al.

[11] Patent Number: 5,913,153
[45] Date of Patent: Jun. 15, 1999

[54] MOBILE STATION WITHOUT A TRANSMISSION/RECEPTION DUPLEXER

[75] Inventors: Kenji Nakamoto; Takashi Enoki, both of Yokohama, Japan

[73] Assignee: Matsushita Electric Industrial Co., Ltd., Osaka, Japan

[21] Appl. No.: 08/734,297

[22] Filed: Oct. 21, 1996

[30] Foreign Application Priority Data

Oct. 27, 1995 [JP] Japan .................................. 7-302280

[51] Int. Cl.⁶ .................................................. H04B 1/00
[52] U.S. Cl. ............................ 455/78; 455/83; 455/277.1
[58] Field of Search ................................. 455/78, 79, 82, 455/103, 277.1, 83, 127, 575, 70, 73, 553

[56] References Cited

U.S. PATENT DOCUMENTS

| | | | |
|---|---|---|---|
| 3,487,310 | 12/1969 | Bateman et al. | 455/73 |
| 4,216,432 | 8/1980 | Imazaki et al. | 455/79 |
| 4,829,591 | 5/1989 | Hashimoto et al. | 455/89 |
| 4,904,993 | 2/1990 | Sato | 455/603 |
| 4,914,714 | 4/1990 | Tamura | 455/78 |
| 4,958,382 | 9/1990 | Imanishi | 455/277 |
| 5,261,121 | 11/1993 | Hashimoto | 455/89 |
| 5,276,914 | 1/1994 | Ishizuka et al. | 455/83 |
| 5,404,572 | 4/1995 | Ishii | 455/67.4 |
| 5,640,686 | 6/1997 | Norimatsu | 455/74 |
| 5,649,306 | 7/1997 | Vannatta | 455/575 |
| 5,809,405 | 9/1998 | Yamaura | 455/101 |

FOREIGN PATENT DOCUMENTS

62-147937  9/1987  Japan .
6-311103  11/1994  Japan .

Primary Examiner—Reinhard J. Eisenzopf
Assistant Examiner—Makoto Aoki
Attorney, Agent, or Firm—Pearne, Gordon, McCoy & Granger LLP

[57] ABSTRACT

A mobile station has a transmission/reception antenna, a reception antenna, external connector terminals, and transmitter and receiver circuits. Only the switch circuit, which includes a plurality of switch elements, is interposed between the antennas and external connector terminals, and the transmitter and receiver circuits. The switch circuit switches among modes of connection between the antennas and external connector terminals, and the transmitter and receiver circuits by switching the plurality of switch elements. A control circuit controls the switch circuit so that a signal passes through only one of the plurality of switch elements, by supplying a control signal to the switch circuit.

12 Claims, 10 Drawing Sheets

| | | SW1 | SW2 | SW3 | SW4 | SW5 |
|---|---|---|---|---|---|---|
| NORMAL COMMUNICATION | TRANSMISSION VIA ANTENNA 14 | ON | OFF | OFF | OFF | — |
| | RECEPTION VIA ANTENNA 15 | OFF | OFF | OFF | OFF | a |
| | RECEPTION VIA ANTENNA 14 | OFF | OFF | ON | OFF | — |
| EXTERNAL CONNECTOR COMMUNICATION | TRANSMISSION VIA EXTERNAL TERMINAL 16 | OFF | ON | OFF | OFF | — |
| | RECEPTION VIA EXTERNAL TERMINAL 16 | OFF | OFF | OFF | ON | — |
| | RECEPTION VIA EXTERNAL TERMINAL 17 | OFF | OFF | OFF | OFF | b |

FIG. 8

| | | SW1 | SW2 | SW3 | SW4 | SW5 | SW6 | SW7 |
|---|---|---|---|---|---|---|---|---|
| MODE 1 | NORMAL COMMUNICATION | TRANSMISSION VIA ANTENNA 14 | ON | OFF | OFF | OFF | -- | c | e |
| | | RECEPTION VIA ANTENNA 15 | OFF | OFF | OFF | OFF | a | -- | -- |
| | | RECEPTION VIA ANTENNA 14 | OFF | OFF | ON | OFF | -- | -- | -- |
| | EXTERNAL CONNECTOR COMMUNICATION | TRANSMISSION VIA EXTERNAL TERMINAL 16 | OFF | ON | OFF | OFF | -- | c | e |
| | | RECEPTION VIA EXTERNAL TERMINAL 17 | OFF | OFF | OFF | ON | -- | -- | -- |
| | | RECEPTION VIA EXTERNAL TERMINAL 17 | OFF | OFF | OFF | OFF | b | -- | -- |
| MODE 2 | NORMAL COMMUNICATION | TRANSMISSION VIA ANTENNA 14 | ON | OFF | OFF | OFF | -- | d | e |
| | | RECEPTION VIA ANTENNA 14 | ON | OFF | OFF | OFF | -- | d | f |
| | EXTERNAL CONNECTOR COMMUNICATION | TRANSMISSION VIA EXTERNAL TERMINAL 16 | OFF | ON | OFF | OFF | -- | d | e |
| | | RECEPTION VIA EXTERNAL TERMINAL 16 | OFF | ON | OFF | OFF | -- | d | f |

FIG. 9

| | | SW1 | SW2 | SW3 | SW4 | SW5 | SW6 | SW7 |
|---|---|---|---|---|---|---|---|---|
| MODE 1 | NORMAL COMMUNICATION | TRANSMISSION VIA ANTENNA 14 | ON | OFF | OFF | OFF | — | c | e |
| | | RECEPTION VIA ANTENNA 15 | OFF | OFF | OFF | OFF | a | — | — |
| | | RECEPTION VIA ANTENNA 14 | OFF | OFF | ON | OFF | — | — | — |
| | EXTERNAL CONNECTOR COMMUNICATION | TRANSMISSION VIA LIGHT-EMITTING ELEMENT SEC. 24 | OFF | ON | OFF | OFF | — | c | e |
| | | RECEPTION VIA PHOTODETECTING ELEMENT SEC. 25 | OFF | OFF | OFF | OFF | b | — | — |
| MODE 2 | NORMAL COMMUNICATION | TRANSMISSION VIA ANTENNA 14 | ON | OFF | OFF | OFF | — | d | e |
| | | RECEPTION VIA ANTENNA 14 | ON | OFF | OFF | OFF | — | d | f |
| | EXTERNAL CONNECTOR COMMUNICATION | TRANSMISSION VIA LIGHT-EMITTING ELEMENT SEC. 24 | OFF | ON | OFF | OFF | — | d | e |
| | | RECEPTION VIA PHOTODETECTING ELEMENT SEC. 25 | OFF | OFF | OFF | OFF | b | — | — |

FIG. 10

| | | SW1 | SW2 | SW3 | SW4 | SW5 | SW6 | SW7 |
|---|---|---|---|---|---|---|---|---|
| MODE 1 | NORMAL COMMUNICATION | TRANSMISSION VIA ANTENNA 14 | ON | OFF | OFF | OFF | -- | c | e |
| | | RECEPTION VIA ANTENNA 14 | OFF | OFF | ON | OFF | -- | -- | -- |
| | | RECEPTION VIA ANTENNA 15 | OFF | OFF | OFF | OFF | a | -- | -- |
| | EXTERNAL CONNECTOR COMMUNICATION | RECEPTION VIA BROADCAST ANTENNA 28 | OFF | OFF | OFF | ON | -- | -- | -- |
| | | RECEPTION VIA EXTERNAL TERMINAL 29 | OFF | OFF | OFF | OFF | b | -- | -- |
| MODE 2 | NORMAL COMMUNICATION | TRANSMISSION VIA ANTENNA 14 | ON | OFF | OFF | OFF | -- | d | e |
| | | RECEPTION VIA ANTENNA 14 | ON | ON | OFF | OFF | -- | d | f |
| | EXTERNAL CONNECTOR COMMUNICATION | RECEPTION VIA BROADCAST ANTENNA 28 | OFF | OFF | OFF | OFF | -- | d | f |

MOBILE STATION WITHOUT A TRANSMISSION/RECEPTION DUPLEXER

BACKGROUND OF THE INVENTION

1. Field of the Invention

The present invention relates to a mobile station for use in mobile communications systems and the like. In particular, the invention is intended to reduce the signal loss occurring between an antenna and transmitter and receiver circuits.

2. Description of the Related Art

Usually, a cellular telephone set or the like has external connector terminals for connection to an external amplifier such as a booster or connection to an evaluation system for evaluating the performance of the cellular telephone set itself. Through the external connector terminal, the cellular telephone set can receive data from or supply data to such an external device.

Figure 6:
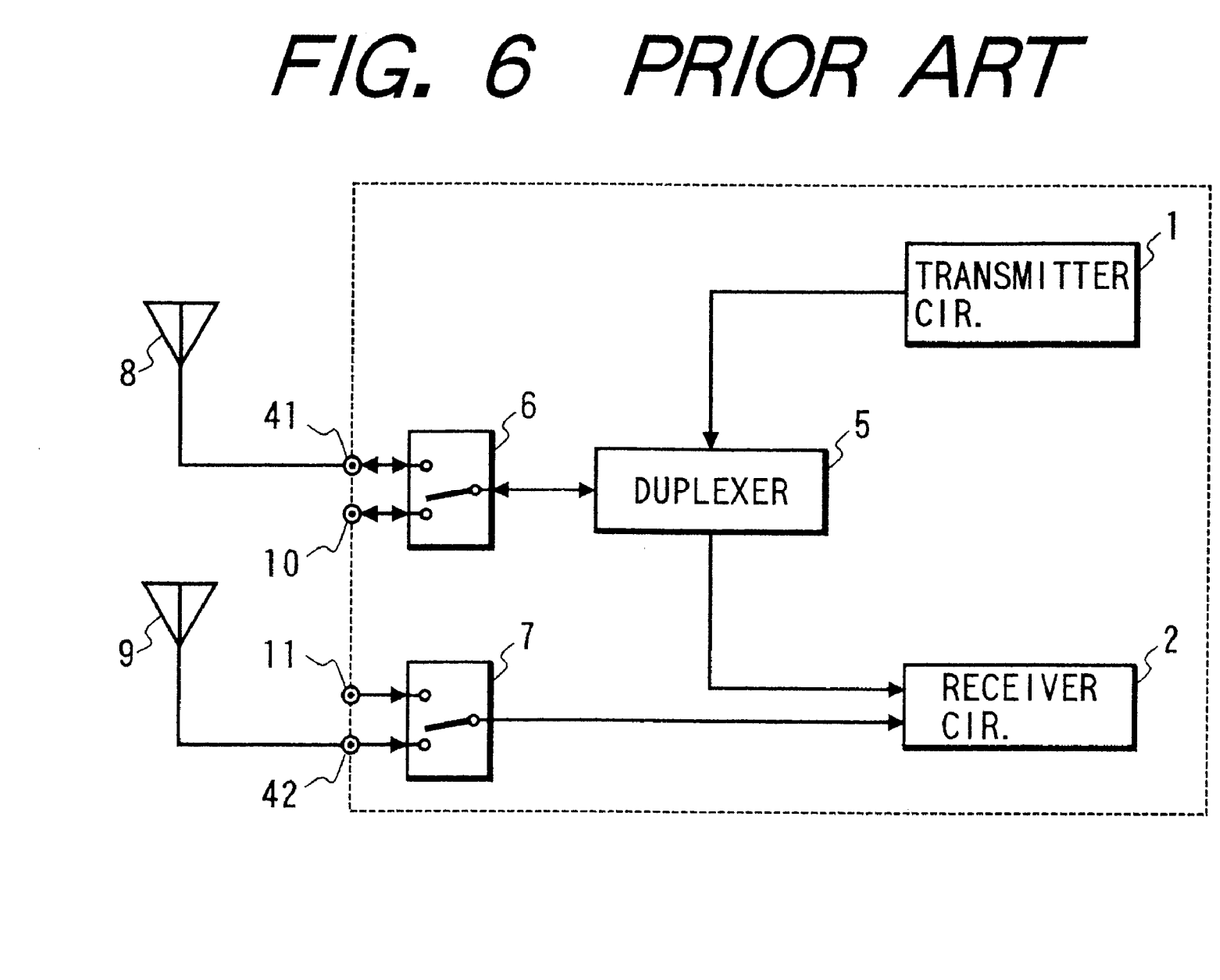
FIG. 6 is a block diagram showing the configuration of a conventional mobile station.

As shown in FIG. 6 this type of conventional mobile station has a transmitter circuit 1 for processing a transmission signal, a receiver circuit 2 for processing a reception signal, a transmission/reception duplexer 5 for separating transmission waves and reception waves from each other, a transmission/reception antenna 8 that is connected to an antenna terminal 41, a reception antenna 9 that is connected to an antenna terminal 42, an input/output external connector terminal 10 an input external connector terminal 11, a switch 6 for selecting the transmission/reception antenna 8 or the input/output external connector terminal 10, and a switch 7 for selecting the reception antenna or the input external connector terminal 11.

In this mobile station, a signal that has been output from the transmitter circuit 1 is supplied to the transmission/reception antenna terminal 41 or the input/output external connector terminal 10 via the transmission/reception duplexer 5 and the switch 6. On the other hands a signal that has been received at the reception antenna terminal 42 or the input external connector terminal 11 is supplied to the receiver circuit 2 via the switch 7.

However, in the above conventional mobile station, large signal loss occurs particularly in its transmission side because the transmission/reception duplexer 5 and the switch 6 are interposed between the transmitter circuit 1 and the antenna terminal 41. Therefore, where the transmission power of the mobile station is determined, it is necessary to increase the output power of the transmitter 1 as much as the above signal loss, imposing an additional load on an amplifier in the transmitter circuit 1.

SUMMARY OF THE INVENTION

An object of the present invention is to provide a mobile station in which signal loss occurring between a transmitter circuit and an antenna terminal is small, and which can switch among various modes of connection between transmitter and receiver circuits and antennas and external connector terminals by means of a simple configuration.

According to the invention, there is provided a mobile station comprising a first antenna for transmission and reception; a second antenna for receptions at least one external connector terminal for allowing connection of an external device to the mobile stations a transmitter circuit; a receiver circuit; a switch circuit including a plurality of switch elements, for switching among modes of connection between the first and second antennas and the at least one external connector terminal, and the transmitter and receiver circuits by switching the plurality of switch elements; and control means for controlling the switch circuit so that a signal passes through only one of the plurality of switch elements, by supplying an electrical control signal to the switch circuit.

With this configuration, since only the switch circuit is interposed between the antennas and external connector terminals and the transmitter and receiver circuits, the signal loss can be reduced. Therefore, particularly in the transmission side, the output power of the transmitting circuit can be decreased as much, which means reduction in the load of an amplifier used. The power consumption can thus be reduced. Further, allowing connection of a variety of external devices to its external connector terminals, the mobile station can be used in various manners by properly controlling the switch circuit.

In the above mobile station, the transmitter circuit may include two transmission paths for passage of a transmission signal, a reception path for supplying a reception signal to the receiver circuit, and a switch for switching among the two transmission paths and the reception path, wherein the control means controls the switch in accordance with an operation mode and transmission/reception operation timing of the mobile stations whereby the mobile station can perform a dual-mode communication. An example of the dual mode is a combination of TDMA-TDD (time division multiple access-time division duplex) and TDMA-FDD (time division multiple access-frequency division duplex).

The above mobile station may further comprise detection means for generating a detection signal upon detecting connection of the external device to one of the at least one external connector terminal, wherein in response to the detection signal the control means controls the switch circuit (and the switch in the transmitter circuit) so that at least one of the transmitter and receiver circuits is connected to the external connector terminal to which the external device is connected. With this configuration, the transmitter circuit or the receiver circuit can automatically be connected to the external connector terminal concerned.

There may be provided a light-emitting element section for optical communication connected to one of the at least one external connector terminal, and a photodetecting element section for optical communication connected to another of the at least one external connector terminal. With this configuration, the mobile station is additionally given an optical communication function.

The above mobile station may further comprise a broadcast reception antenna connected to one of the at least one external connector terminal. With this configuration, the mobile station is additionally given an AM/FM broadcast receiving function.

DESCRIPTION OF THE PREFERRED EMBODIMENTS

Embodiments of the present invention will be hereinafter described with reference to the accompanying drawings.

Embodiment 1

Figure 1:
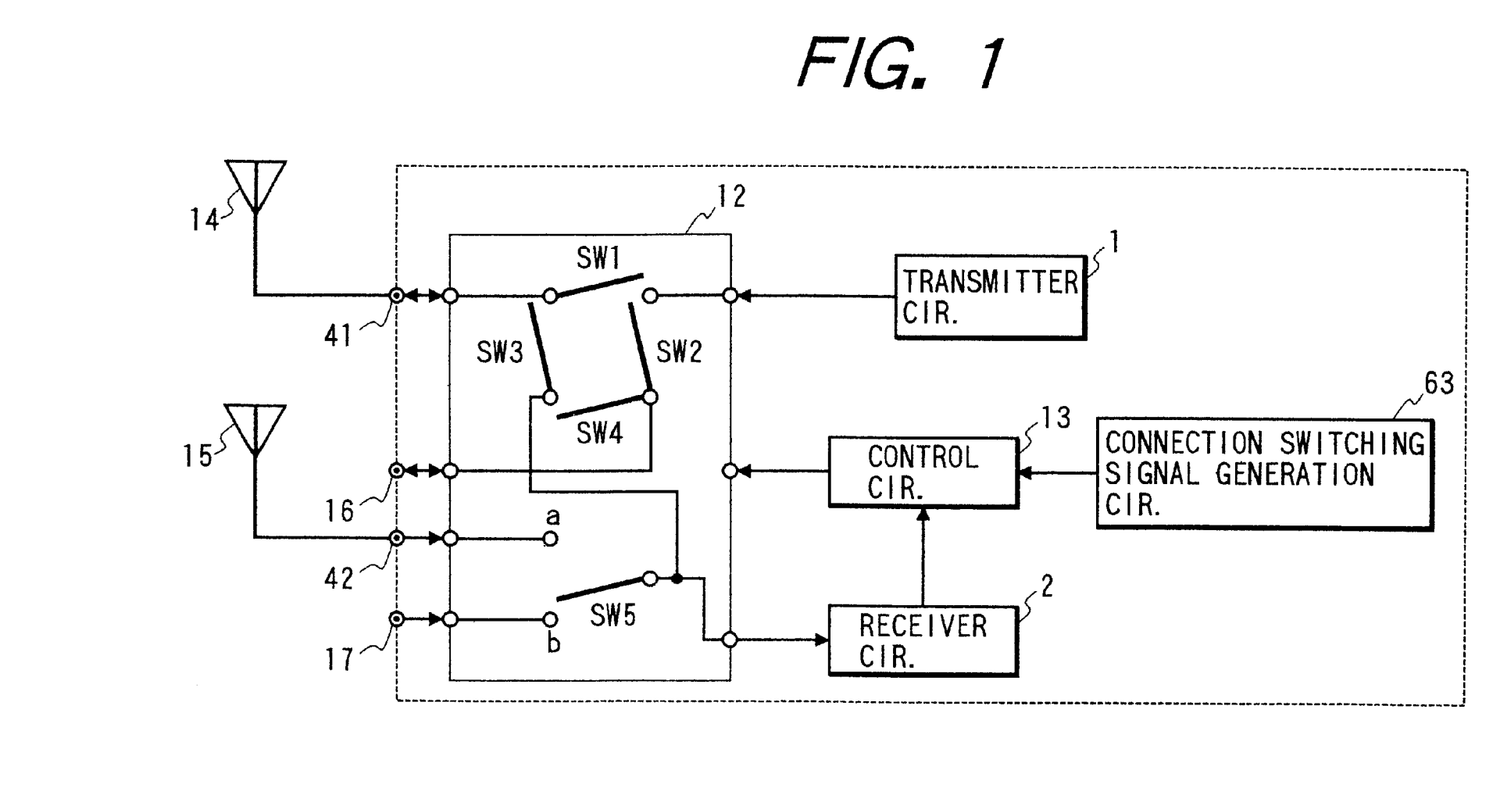
FIG. 1 is a block diagram showing the configuration of a mobile station according to a first embodiment of the present invention.

As shown in FIG. 1, a mobile station according to a first embodiment of the invention includes a transmitter circuit 1, a receiver circuit 2, an antenna terminal 41 to which a transmission/reception antenna 14 is connected, an antenna terminal 42 to which a reception antenna 15 is connected, an input/output external connector terminal 16, an input external connector terminal 17, a switch circuit 12 for switching among modes of connection between the terminals 41, 42, 16, and 17 and the transmitter and receiver circuits 1 and 2, and a control circuit 13 for controlling the switching operation of the switch circuit 12.

The switch circuit 12 has four switch elements SW1–SW4 for switching between the transmission/reception antenna terminal 41 and the input/output external connector terminal 16, and a switch element SW5 for switching between the reception antenna terminal 42 and the input external connector terminal 17. The switch elements SW1–SW5 are operated (opened or closed) in accordance with an output signal of the control circuit 13 to establish a connection between the antenna terminals 41 and 42 and the external connector terminals 16 and 17, and the transmitter and receiver circuits 1 and 2.

Figure 7:
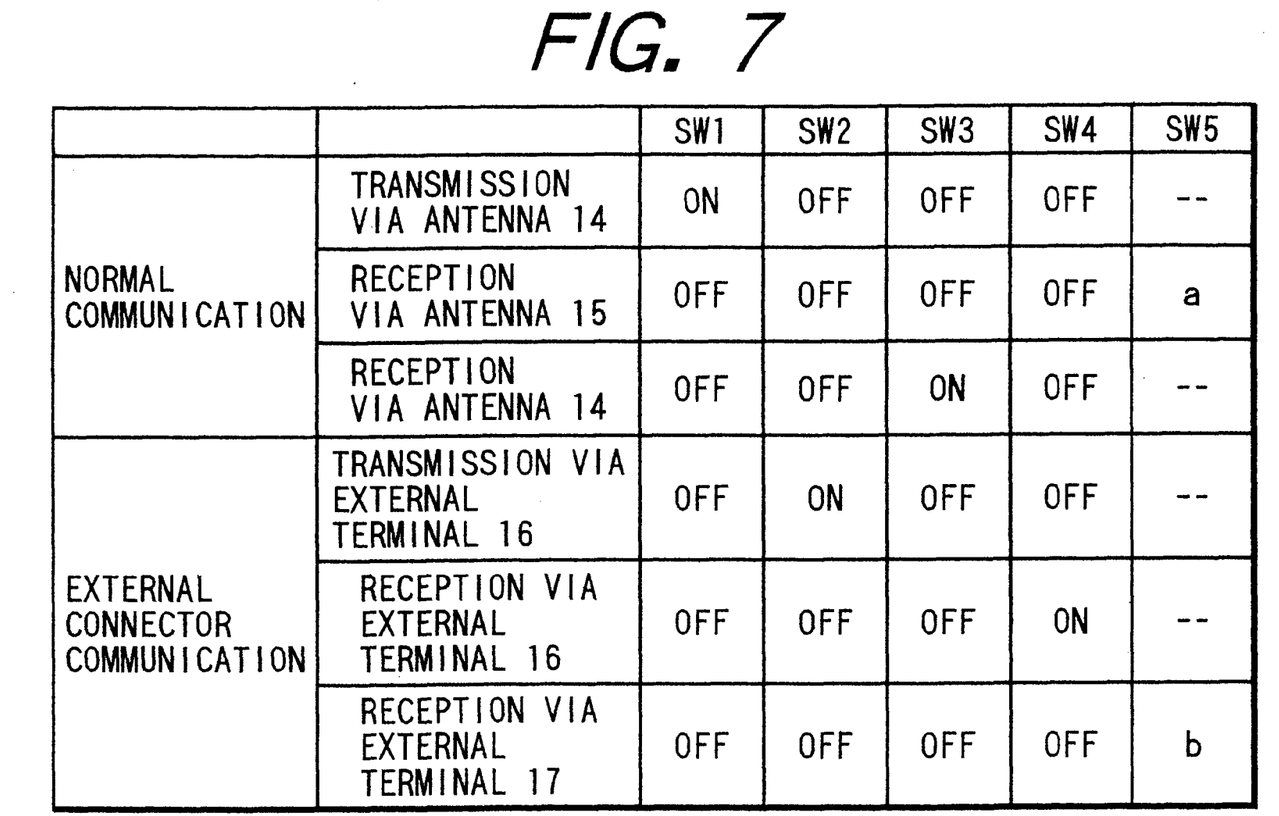
FIG. 7 is a table showing connection modes of switch elements of a switch circuit in the first embodiment.

The control circuit 13 on/off-controls or switches the switch elements SW1–SW5 of the switch circuit 12 as shown in FIG. 7 in accordance with the transmission/reception operation timing of the mobile station and a switching signal that is supplied from a connection switching signal generation circuit 63 and designating a normal communication or an external connector communication. The switching in accordance with the transmission/reception operation timing is effected by a switching signal that is generated within the control circuit 13. The switching signal is output from the generation circuit 63 in response to a key operation on the mobile station main body, for instance.

The mobile station operates in the following manner in a normal communication. During transmission, only the switch element SW1 is made on being controlled by the control circuit 13, so that a signal that is output from the transmitter circuit 1 is supplied to the transmission/reception antenna 14 via the switch element SW1. During reception, in the case where the antenna 14 is selected, only the switch element SW3 is made on, so that a reception signal is input to the receiver circuit 2 via the switch element SW3. Where the antenna 15 is selected, the switch element SW5 selects terminal a, so that a reception signal is input to the receiver circuit 2 via terminal a.

The switching between the antennas 14 and 15 in a receiving operation is effected, for instance, such that the levels of reception waves coming from the respective antennas 14 and 15 are measured before the reception timing and the antenna 14 or 15 providing a higher reception wave level is selected.

The mobile station operates in the following manner in an external connector communication. During transmission, only the switch element SW2 is made on, so that a signal that is output from the transmitter circuit 1 is supplied to the external connector terminal 16 via the switch element SW2. During reception, the switch element SW5 selects terminal b, so that a reception signal coming from the external connector terminal 17 is supplied to the receiver circuit 2 via terminal b. Alternatively only the switch element SW4 is made on, so that a reception signal coming from the external connector terminal 16 is supplied to the receiver circuit 2 via the switch element SW4.

In this manner, connection between the transmitter and receiver circuits 1 and 2 and the antenna terminals 41 and 42 and external connector terminals 16 and 17 is effected through only one switch element in the switch circuit 12. Therefore, this mobile station can reduce the signal loss. In particular, in the transmission side, the output power of the transmitter circuit can be reduced as much, contributing to reduction in power consumption.

Embodiment 2

A mobile station according to a second embodiment has a function of switching between signal paths in a transmitter circuit in accordance with the operation mode of the mobile station.

Figure 2:
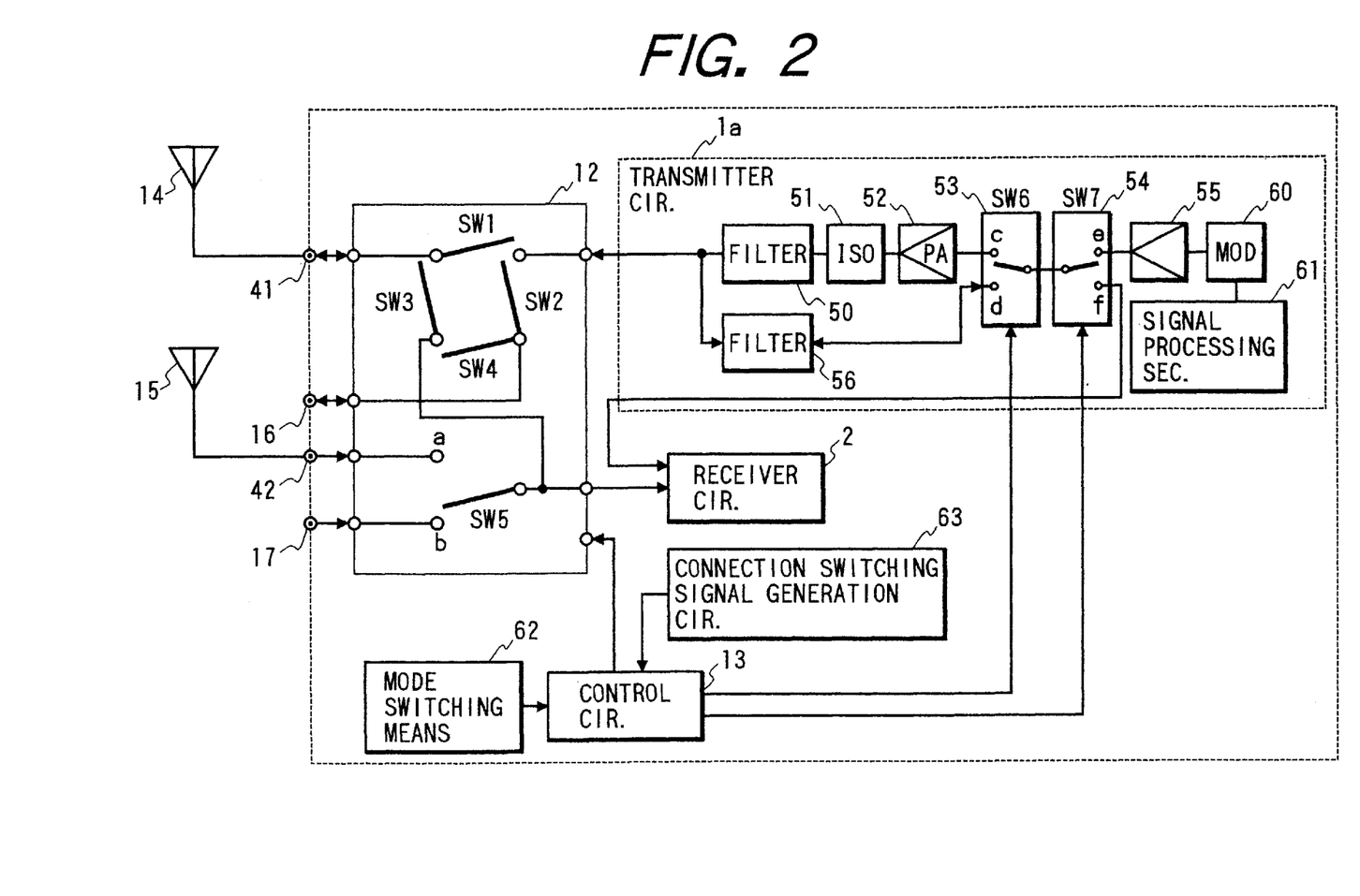
FIG. 2 is a block diagram showing the configuration of a mobile station according to a second embodiment of the invention.

As shown in FIG. 2, a transmitter circuit 1a has a first filter 50 for suppressing unnecessary wave components of a transmission signal, and isolator 51 for passing a transmission signal and prohibiting passage of a signal traveling in the opposite direction, a first amplifier 52 for amplifying a transmission signal, and a second filter 56 for suppressing unnecessary wave components of a reception signal. The transmitter circuit 1a further has first and second switch elements 53 and 54 (SW6 and SW7) for connecting terminals c and e or terminals d and e during transmission and for connecting terminals d and f during reception, a second amplifier 55 for amplifying a transmission signal, a modulator 60 for modulating a transmission signal, and a transmission signal processing section 61. The other part of the configuration of this mobile station is the same as in the first embodiment.

Figure 8:
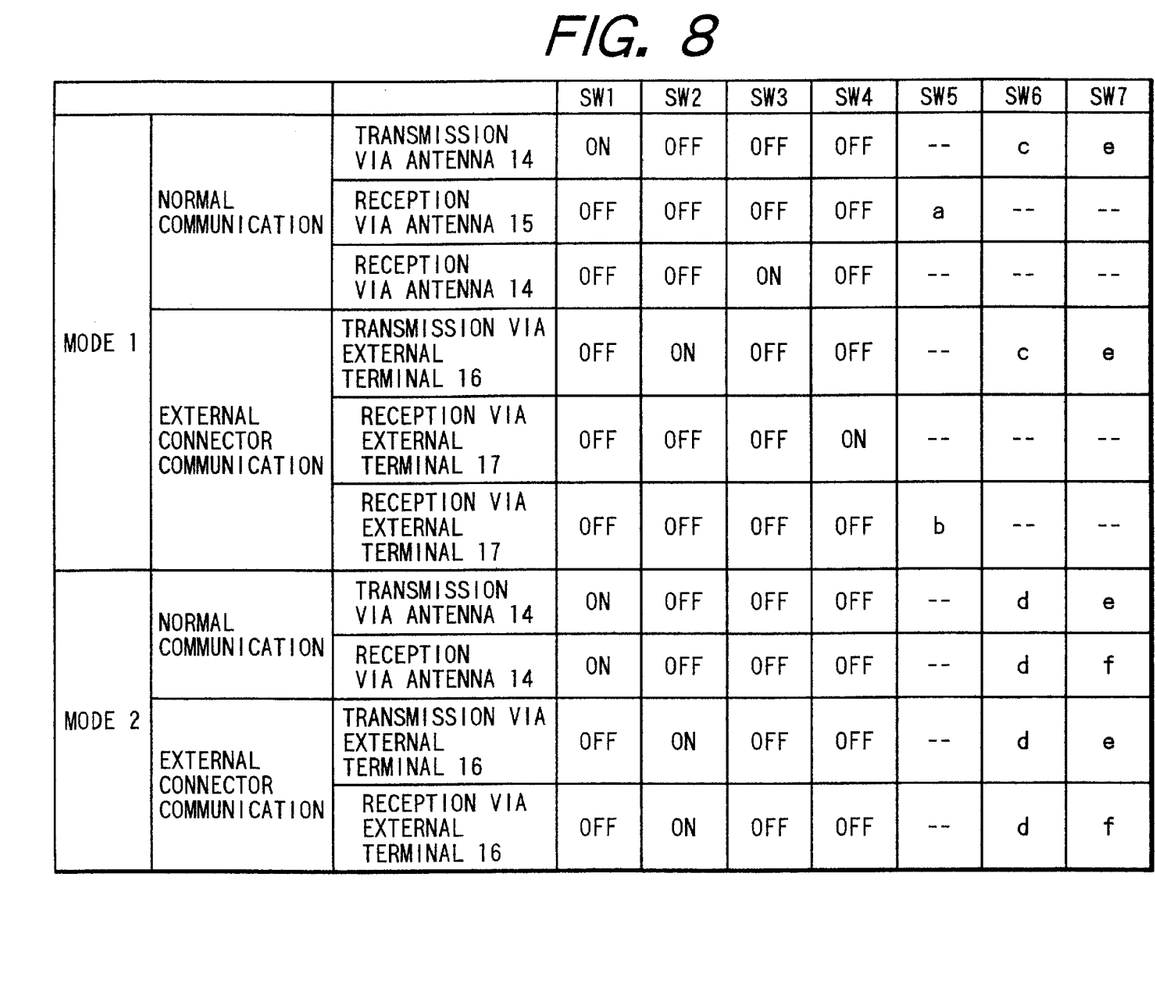
FIG. 8 is a table showing connection modes of switch elements in the second and third embodiments.

In this mobile station, the switch elements SW1–SW5 in the switch circuit 12 and the switch elements SW6 and SW7, all of which are controlled by the control circuit 13, are on/off-controlled or switched as shown in FIG. 8 in accordance with the operation mode (mode switching means 62), the transmission/reception operation timing of the mobile station, and a switching signal that is supplied from the connection switching signal generation circuit 63.

In mode 1 (see FIG. 8), the mobile station operates in the following manner. During transmission in a normal communication, the switch element SW1 is made on and the switch elements SW6 and SW7 connect terminals c and e. A transmission signal that has been output from the modulator 60 is output from the transmitter circuit 1a via the second amplifier 55, first amplifier 52, isolator 51, and first filter 50, and then supplied to the antenna 14 via the switch circuit 12. During reception, the mobile station operates in the same manner as in the first embodiment.

During transmission in an external connector communications the switch element SW2 is made on and the switch elements SW6 and SW7 connect terminals c and e, so that a signal that has been output from the transmitter circuit 1a is supplied to the input/output external connector terminal 16. During reception, the mobile station operates in the same manner as in the first embodiment.

In mode 2 (see FIG. 8), the mobile station operates in the following manner. During transmission in a normal communication, the switch element SW1 is made on and the switch elements SW6 and SW7 connect terminals d and e. A transmission signal that has been output from the modulator 60 is output from the transmitter circuit 1a via the amplifier 55 and the second filter 56 for suppressing unnecessary wave components of the transmission signal, and then supplied to the antenna 14 via the switch element SW1, During reception, the switch element SW1 is made on and the switch elements SW6 and SW7 connect terminals d and f. A reception signal coming from the antenna 14 is first supplied, via the switch element SW1, to the transmitter circuit 1a, where unnecessary wave components are suppressed by the second filter 56. After passing through the switch elements SW6 and SW7, the reception signal is input to the receiver circuit 2.

In an external connector communication, during each of transmission and reception, the mobile station operates in the same manner as in the case of using the antenna 14 except that the switch element SW1 is made off and the switch element SW2 is made on.

As described above, in this mobile stations switching among modes of connection between the transmitter and receiver circuits 1a and 2, and the antenna terminals 41 and 42 and external connector terminals 16 and 17 can be performed by controlling the on/off or switching states of the switch elements SW1–SW5 in the switch circuit 12. Further, switching between the paths in the transmitter circuit 1a can be performed in accordance with the operation mode setting and the operation timing. Therefore, this mobile station can be used for a dual-mode communication of TDMA-TDD (mode 2) and TDMA-FDD (mode 1).

Embodiment 3

In a mobile station according to a third embodiment of the invention, the switch elements are switched in response to connection of an external device to the external connector terminals.

Figure 3:
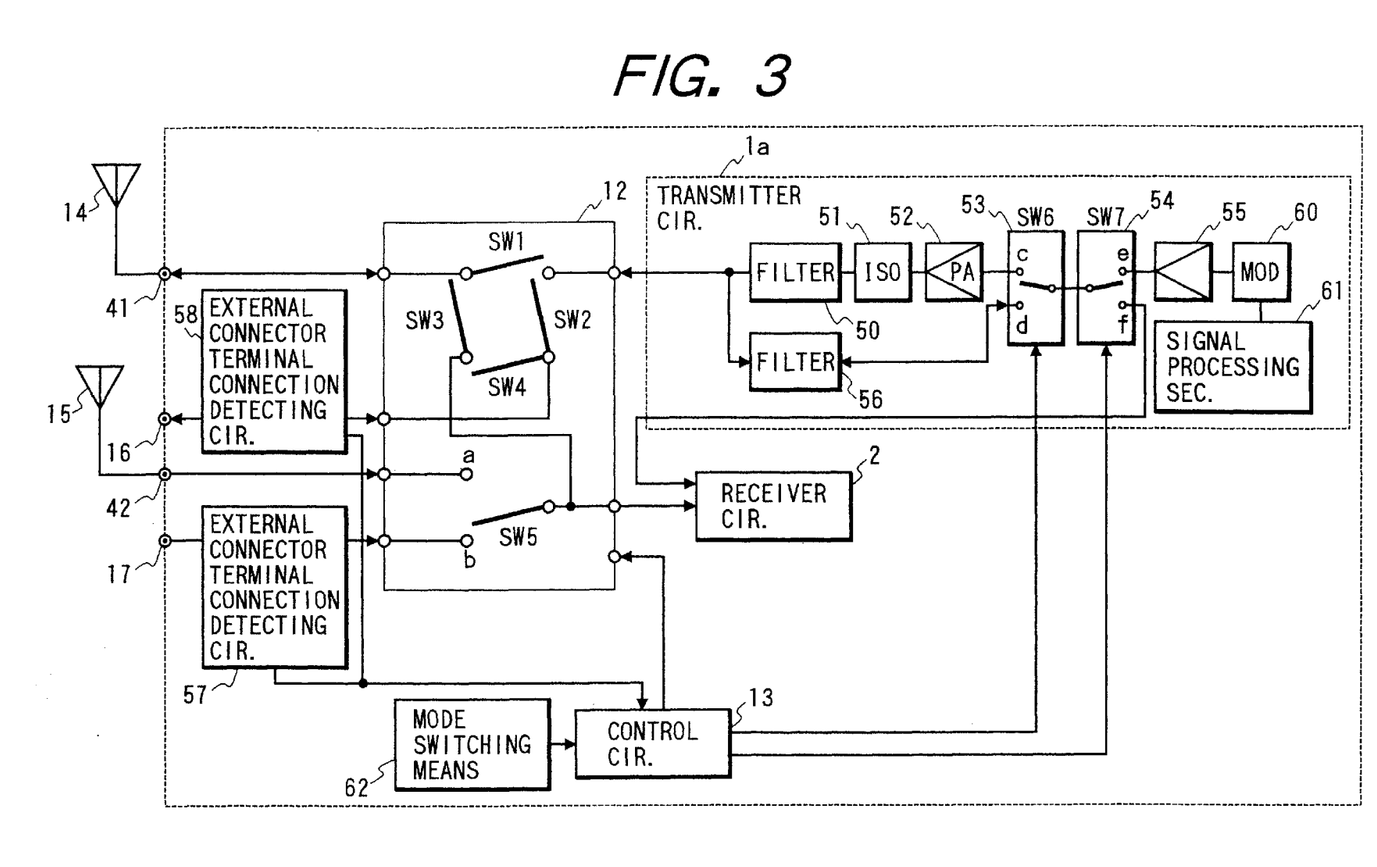
FIG. 3 is a block diagram showing the configuration of a mobile station according to a third embodiment of the invention.

As shown in FIG. 3, this mobile station is equipped with external connector terminal connection detecting circuits 57 and 58 for detecting connection of an external device to the external connector terminals 16 and 17, respectively. The other part of the configuration of this mobile station is the same as in the second embodiment.

The external connector terminal connection detecting circuits 57 and 58 detect whether an external device is connected to the external connector terminals 16 and 17, respectively, and supply a signal to the control circuit 13 accordingly. The control circuit 13 on/off-controls or switches the switch elements SW1–SW5 in the switch circuit 12 and the switch elements SW6 and SW7 as shown in FIG. 8. Upon reception of a signal indicating connection of an external device from one of the external connector terminal connection detecting circuits 57 and 58, the control circuit 13 establishes a connection state for an external connector communication.

With the above configuration, in a normal communication, this mobile station operates in the same manner as in the second embodiment. Upon connection of an external device to one of the external connector terminals 16 and 17, the mobile station detects it and automatically establishes a connection state for an external connector communication without the need of a switching signal from the connection switching signal generation circuit 63, unlike the case of the first and second embodiments. Therefore, the switching elements SW1–SW7 can be switched to effect connection to the external connector terminal 16 or 17 by a single manipulation of attaching an external device, thus simplifying manipulations on the mobile station.

Embodiment 4

A mobile station according to a fourth embodiment of the invention is featured by an optical communication function.

Figure 4:
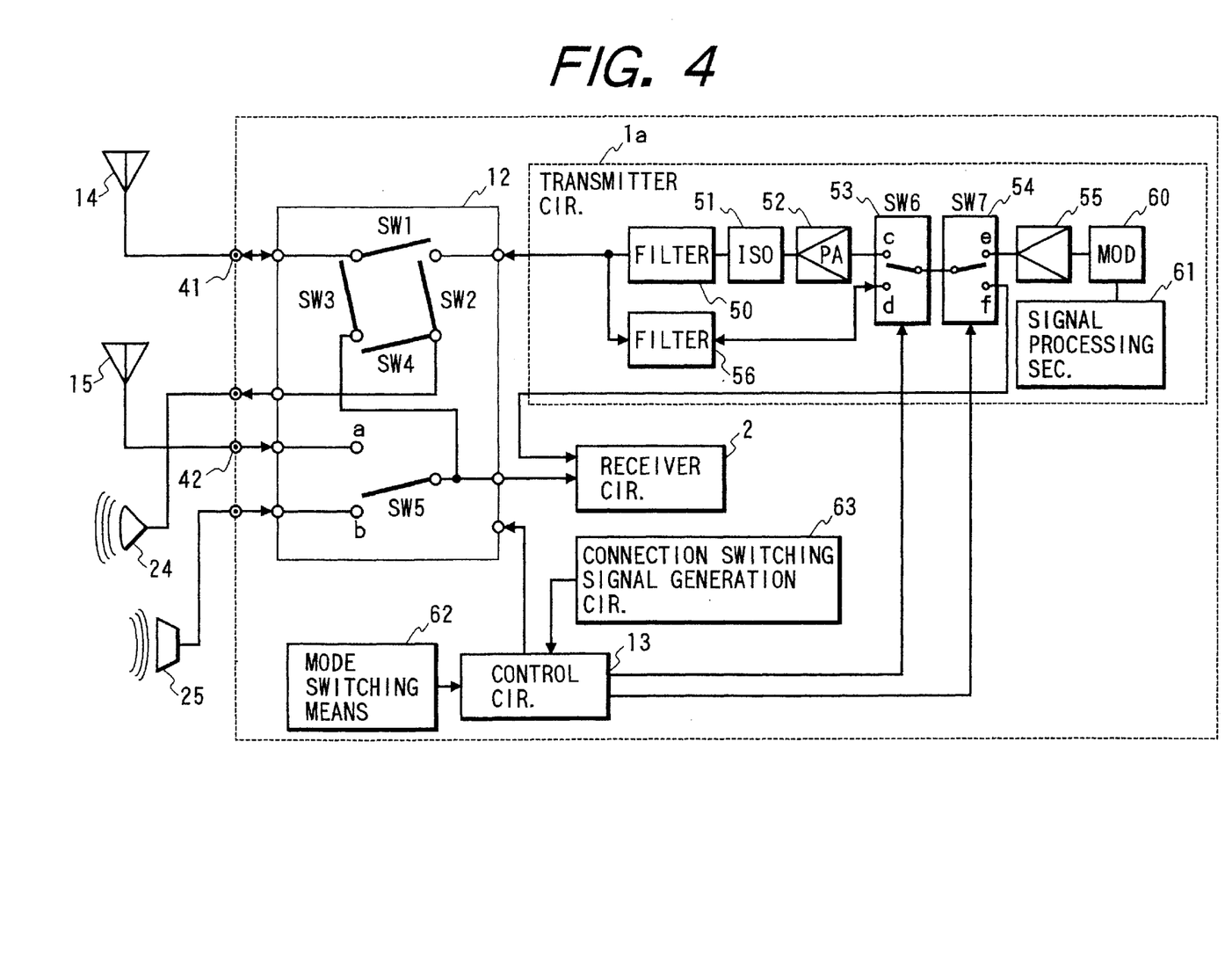
FIG. 4 is a block diagram showing the configuration of a mobile station according to a fourth embodiment of the invention.

As shown in FIG. 4, this mobile station is equipped with a signal output light-emitting element section 24 for transmitting an optical signal, and a signal input photodetecting element section 25 for receiving an optical signal. The other part of the configuration of this mobile station is the same as in the second embodiment.

Figure 9:
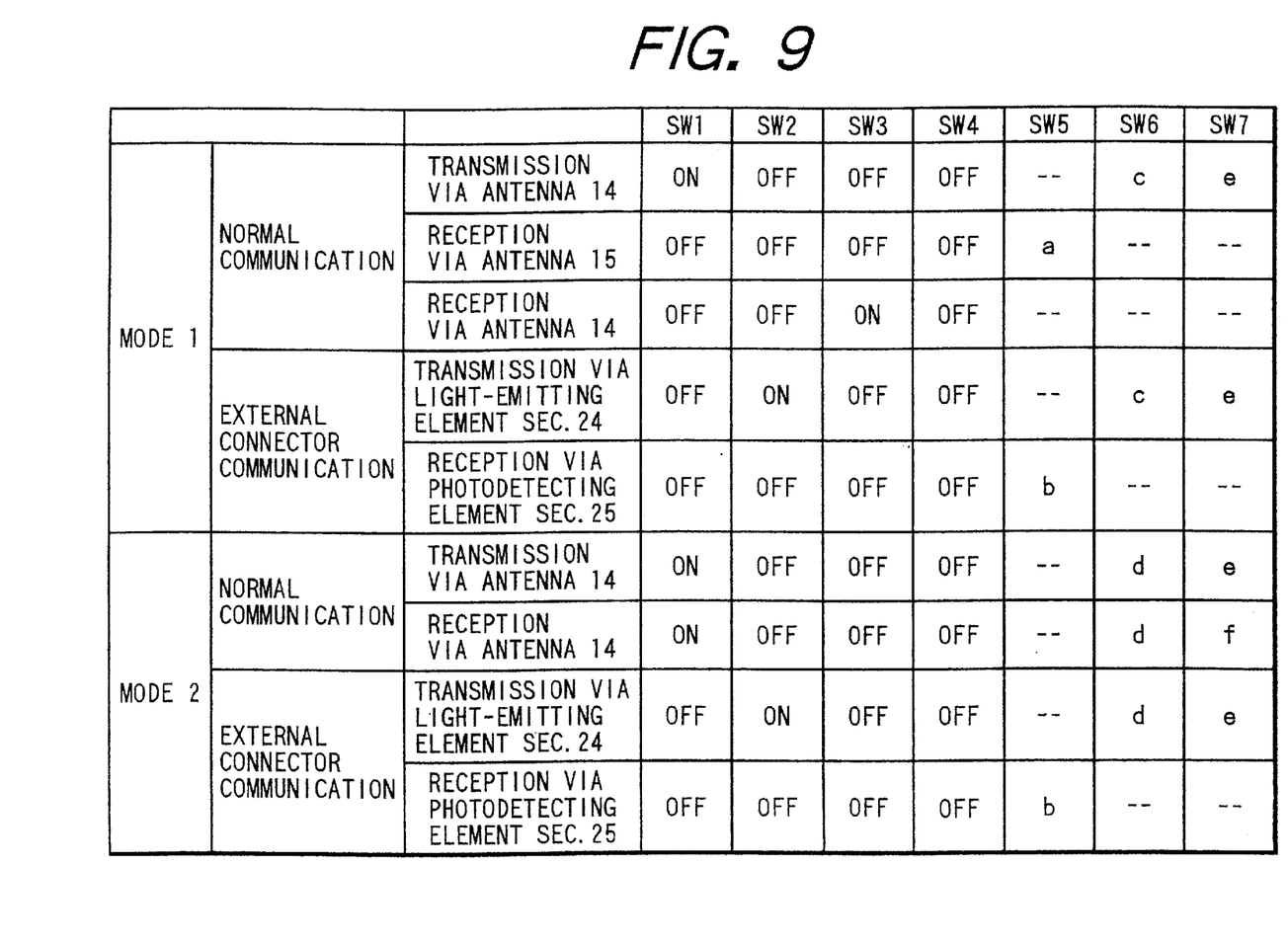
FIG. 9 is a table showing connection modes of switch elements in the fourth embodiment.

In this mobile station, the switch elements SW1–SW7 are switched as shown in FIG. 9 in accordance with its operation mode. In mode 1, the switching of the switch elements SW1–SW7 and the signal flow are the same as in the second embodiment except that the external connector terminal 16 cannot receive a signal though it can transmit a signal. This is because the light-emitting element section 24 has only the transmission function for optical communication.

In mode 2 the switches SW1–SW7 are controlled in the same manner as in the second embodiment except for a case of receiving a signal by the photodetecting element section 25. That is, a signal received by the photodetecting element section 25 is supplied to the receiving section 2 via the switch elements SW5, SW4 and SW2.

In this manner, this mobile station can perform a dual-mode communication of TDMA-TDD and TDMA-FDD as well as optical communication by properly switching among the antenna terminals and the optical communication element sections.

Embodiment 5

A mobile station according to a fifth embodiment of the invention is featured by a broadcast receiving function.

Figure 5:
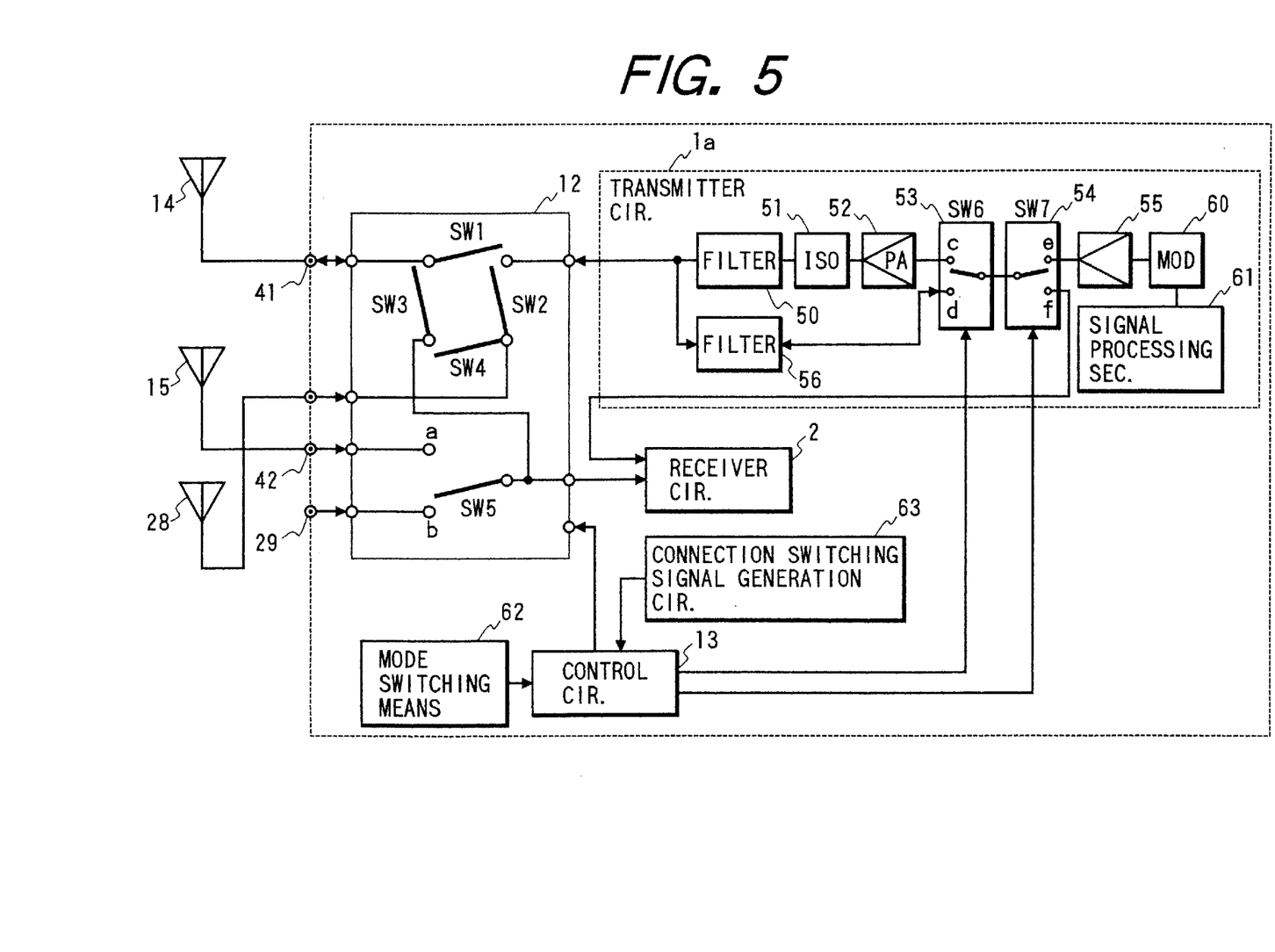
FIG. 5 is a block diagram showing the configuration of a mobile station according to a fifth embodiment of the invention.

As shown in FIG. 5, the mobile station is equipped with an antenna 28 for receiving an AM or FM broadcast signal as well as a single external connector terminal 29. The other part of the configuration of this mobile station is the same as in the second embodiment.

Figure 10:
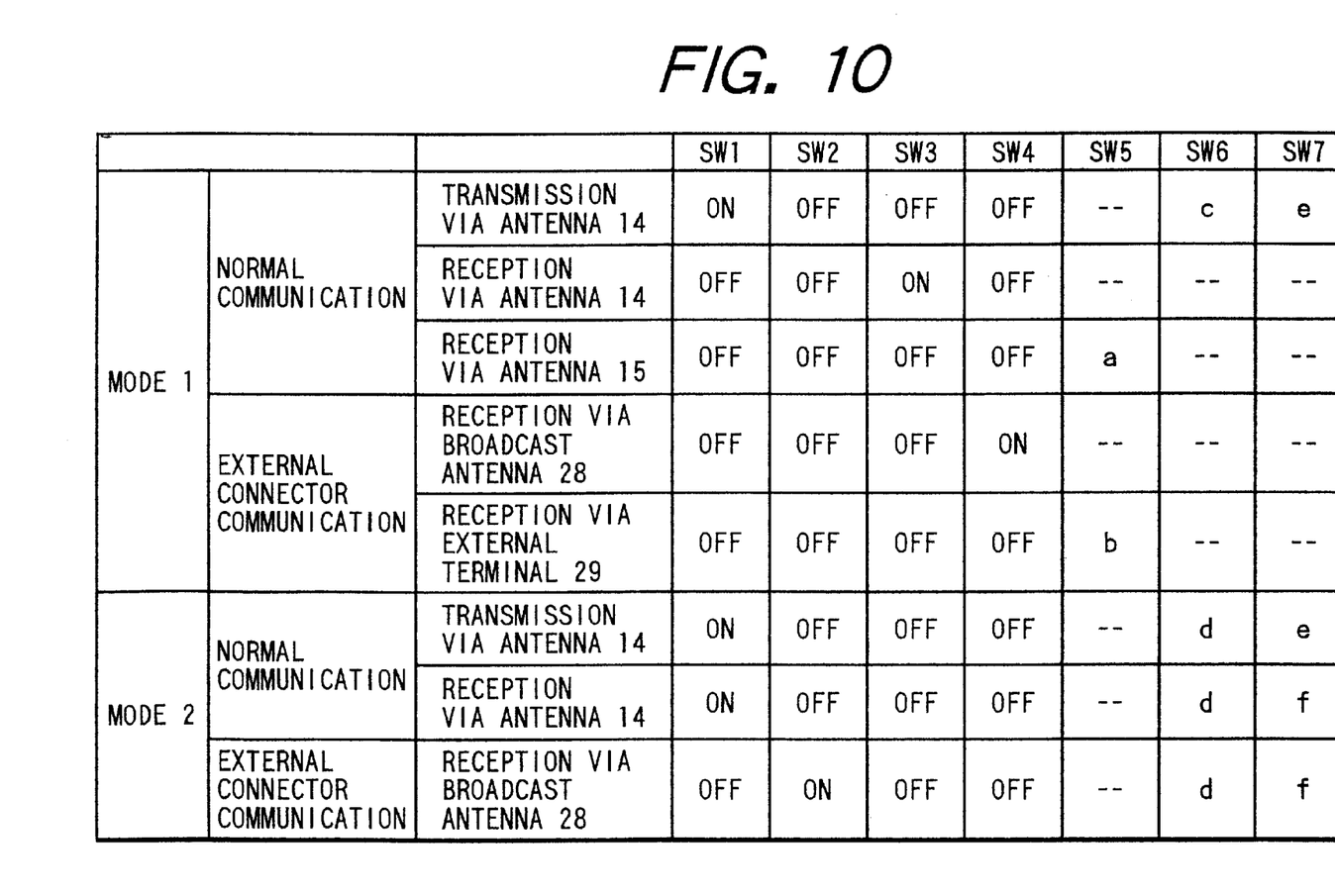
FIG. 10 is a table showing connection modes of switch elements in the fifth embodiment.

In this mobile station, the switch elements SW1–SW7 are switched as shown in FIG. 10 in accordance with the type of its operation. This mobile station operates in the same manner as in the second embodiment except that the transmission/reception external connector terminal 16 of the second embodiment is replaced by the AM/FM broadcast reception antenna 28 that is dedicated to reception.

During reception of an AM or FM broadcast signal in mode 1, the switch circuit 12 is so controlled that only the switch element SW4 is made on. In mode 2, the control circuit 13 is so controlled that the switch element SW2 is made on and the switch elements SW6 and SW7 connect terminals d and f, whereby a signal coming from the broadcast reception antenna 28 is supplied to the receiver circuit 2 via the transmitter circuit 1a.

Thus, this mobile station have functions of dual-mode communication of TDMA-TDD and TDMA-FDD, AM/FM broadcast reception, and connection to an external device via the external connector terminal.

What is claimed is:

1. A mobile station comprising:

a first antenna for transmission and reception;

a second antenna for reception;

at least one external connector terminal for allowing connection of an external device to the mobile station;

a transmitter circuit;

a receiver circuit;

a switch circuit including a plurality of switch elements, for switching among modes of connection between the first and second antennas and the at least one external connector terminal, and the transmitter and receiver circuits by switching the plurality of switch elements, said plurality of switch elements include four switch elements for selecting the first antenna or an input/output external connector terminal and a changeover switch for selecting the second antenna or an input external connector terminal; and control means for controlling the switch circuit so that a signal passes through only one of the plurality of switch elements, by supplying an electrical control signal to the switch circuit.

2. A mobile station comprising:

a first antenna for transmission and reception;

a second antenna for reception;

at least one external connector terminal for allowing connection of an external device to the mobile station;

a receiver circuit;

a transmitter circuit, said transmitter circuit including two transmission paths for passage of a transmission signal, a reception path for supplying a reception signal to the receiver circuit, and a switch for switching among the two transmission paths and the reception path;

a switch circuit including a plurality of switch elements, for switching among modes of connection between the first and second antennas and the at least one external connector terminal, and the transmitter and receiver circuits by switching the plurality of switch elements; and control means for controlling the switch circuit so that a signal passes through only one of the plurality of switch elements, by supplying an electrical control signal to the switch circuit, wherein the control means controls the switch in accordance with an operation mode and transmission/reception operation timing of the mobile station, whereby the mobile station can perform a dual-mode communication.

3. The mobile station according to claim 2, wherein a transmission signal or a reception signal is directly exchanged between the switch circuit and the transmitter circuit or receiver circuit.

4. The mobile station according to claim 2, wherein one of the two transmission paths and the reception path share a filter.

5. The mobile station according to claim 1, further comprising detection means for generating a detection signal upon detecting connection of the external device to one of the at least one external connector terminal, wherein in response to the detection signal the control means controls the switch circuit so that at least one of the transmitter and receiver circuits is connected to the external connector terminal to which the external device is connected.

6. The mobile station according to claim 2, further comprising detection means for generating a detection signal upon detecting connection of the external device to one of the at least one external connector terminal, wherein in response to the detection signal the control means controls the switch circuit and the switch in the transmitter circuit so that at least one of the transmitter and receiver circuits is connected to the external connector terminal to which the external device is connected 7. A mobile station comprising:

first antenna for transmission and reception;

a second antenna for reception;

at least one external connector terminal for allowing connection of an external device to the mobile station;

a transmitter circuit;

a receiver circuit;

a switch circuit including a plurality of switch elements, for switching among modes of connection between the first and second antennas and the at least one external connector terminal and the transmitter and receiver circuits by switching the plurality of switch elements;

control means for controlling switching of the switch circuit by supplying an electrical control signal to the switch circuit;

a light-emitting element section for optical communication connected to one of the at least one external connector terminal; and a photodetecting element section for optical communication connected to another of the at least one external connector terminal.

8. The mobile station according to claim 7, wherein the transmitter circuit includes two transmission paths for passage of a transmission signal, a reception path for supplying a reception signal to the receiver circuit, and a switch for switching among the two transmission paths and the reception path, wherein the control means controls the switch in accordance with an operation mode and transmission/reception operation timing of the mobile station, whereby the mobile station can perform a dual-mode communication.

9. The mobile station according to claim 2, further comprising a broadcast reception antenna connected to one of the at least one external connector terminal.

10. The mobile station according to claim 2, wherein the plurality of switch elements include four switch elements for selecting the first antenna or an input/output external connector terminal, and a changeover switch for selecting the second antenna or an input external connector terminal.

11. The mobile station according to claim 1, wherein a transmission signal or a reception signal is directly exchanged between the switch circuit and the transmitter circuit or receiver circuit.

12. The mobile station according to claim 1, further comprising a broadcast reception antenna connected to one of the at least one external connector terminal.

* * * * *

UNITED STATES PATENT AND TRADEMARK OFFICE
CERTIFICATE OF CORRECTION

PATENT NO. : 5,913,153
DATED : June 15, 1999
INVENTOR(S) : Nakamoto et al.

It is certified that error appears in the above-identified patent and that said Letters Patent is hereby corrected as shown below:

Column 1, Line 36, delete "hands" and insert --hand,--.

Column 1, Line 60, delete "receptions" and insert --reception;--.

Column 1, Line 62, delete "stations" and insert --station;--.

Column 2, Line 22, delete "stations" and insert --station,--.

Column 8, Line 8, Claim 7, before "first", insert --a--.

Column 8, Line 19, Claim 7, after "terminal", insert --,-- (comma).

Signed and Sealed this

Ninth Day of November, 1999

Attest:

Q. TODD DICKINSON

Attesting Officer

Acting Commissioner of Patents and Trademarks